United States Patent [19]

Zweighaft et al.

[11] Patent Number: 4,502,647
[45] Date of Patent: Mar. 5, 1985

[54] TAPE ATTACHED SENSOR

[75] Inventors: James Zweighaft; Steven P. Georgis, both of Boulder

[73] Assignee: Storage Technology Corporation, Louisville, Colo.

[21] Appl. No.: 454,227

[22] Filed: Dec. 29, 1982

[51] Int. Cl.³ ............................................. G11B 15/46
[52] U.S. Cl. .................................... 242/191; 242/57; 318/7; 360/74.2
[58] Field of Search ............. 242/186, 191, 57, 75.52; 318/6, 7, 67, 72, 326; 360/72.3, 73, 74.2

[56] References Cited

U.S. PATENT DOCUMENTS

| | | | |
|---|---|---|---|
| Re. 30,939 | 5/1982 | d'Alayer de Costemore d'Arc et al. | 242/191 X |
| 3,473,042 | 10/1969 | Orlando | 242/186 X |
| 3,668,492 | 6/1972 | Konishi et al. | 360/73 X |
| 3,746,278 | 7/1973 | Dennis et al. | 318/6 X |
| 3,795,371 | 3/1974 | Tolini et al. | 242/186 X |
| 3,809,328 | 5/1974 | Cope et al. | 318/6 X |
| 3,823,895 | 7/1974 | Jones et al. | 242/186 |

*Primary Examiner*—Stuart S. Levy
*Assistant Examiner*—Joseph J. Hail, III
*Attorney, Agent, or Firm*—Bryant R. Gold

[57] ABSTRACT

A method and system for detecting tape attachment to a machine reel of an automatically threading magnetic tape system. During the threading process, a file reel is rotated to allow a sufficient length of tape to be unwound therefrom, which length of tape eventually attaches to the machine reel after being automatically threaded through the desired tape path. The rotation of the file reel is maintained during this threading process by delivering current pulses to a file reel motor. These current pulses are counted per unit time. As soon as the tape attaches to the machine reel, the machine reel begins to pull the tape from the file reel, thereby eliminating the need to deliver current pulses to the file reel motor, at the same rate as needed prior to tape attachment. A change in the rate of the current pulses delivered to the file reel motor signals a tape attached condition.

8 Claims, 2 Drawing Figures

TAPE ATTACHED SENSOR

BACKGROUND OF THE INVENTION

This invention relates to a method and system of detecting when the tape is attached to the machine reel during the automatic tape threading process of a magnetic tape system. More paricularly, it relates to a method and system that has no moving parts and requires no adjustments.

Magnetic tape systems have a file reel and a machine reel. The file reel is removable and contains the magnetic tape that will be written on, or read from, by the magnetic tape system's read/write heads. The machine reel is nonremovable and acts as a storage reel for the magnetic tape from the file reel as it is read from or written on by the read/write heads.

The path that the magnetic tape takes between the file reel and the machine reel is usually quite serpentine, passing over and around a multiplicity of idler rollers and driver rollers. To relieve the operator of the task of threading the tape through the path every time the file reel is changed, systems that automatically thread the tape have been developed.

In a typical automatic threading system, the operator places the new file reel on the file spindle and presses the LOAD (or its equivalent) switch. The file reel turns slowly while air pressure is used to direct the tape along its path to the machine reel. Sometimes jets of positive air pressure blow the end of the tape in the desired direction and at other times a negative air pressure is used to draw the end of the tape to a desired location. The details of automatic tape threading are well known and documented in the prior art.

Some method of detecting when the tape is attached to the machine reel must be used with automatic tape threading systems so that the loading sequence can be stopped and the next step of the operation started. In the prior art, this is usually done with a pressure switch. Typically, the hub of the machine reel is hollow and has several holes drilled in its circumference. Air is drawn through these holes and through a pressure sensing switch. When the tape is directed to the hub of the machine reel, the air being drawn through the holes sucks the tape down on the hub. As the hub rotates, it winds the tape around the hub until it overlaps. This covers all the holes and the air pressure through the switch drops, causing the switch to actuate, signalling that the tape is attached.

Unfortunately, this type of attachment, though simple, has several disadvantages: (1) the switch, being mechanical, is subject to wear and therefore to eventual failure; (2) the switching pressure of the switch must be manually adjusted, in some cases at periodic intervals; (3) not every tape attachment will cause the same level of pressure drop, due to abnormalities in the tape surface and the manner in which the holes are covered, compounding the switch adjustment problem; and (4) changes in air pressure, e.g., leaks in the system, changes in the pump drawing the air through the holes, changes in atmospheric pressure, etc., can cause the switch to actuate at the wrong time.

As described above, it should be evident that the pressure sensing switch is an unreliable and unsatisfactory method of detecting tape attachment. It should also be evident that there exists in the art a need for replacing the pressure switch with a more reliable method of detecting tape attachment.

SUMMARY OF THE INVENTION

It is an object of the present invention to provide an improved method and system for detecting tape attachment on an automatically threading magnetic tape system.

It is a further object of the present invention to provide such a tape attached method and system that uses no mechanical parts, such as pressure actuated switches; does not require air pressure for its operation; is highly reliable; and requires no adjustments.

These and other objectives are realized with a tape system that uses a conventional automatic threading operation. During this threading operation, the file reel is accelerated or rotated to allow a sufficient length of tape to be unwound so that the length of tape can eventually pass through the desired tape path to the machine reel. This rotating or accelerating of the file reel is accomplished by delivering current pulses to the file reel motor. The present invention counts these accelerating pulses per unit time when the tape is being threaded. When the tape attaches to the machine reel, the machine reel begins to pull the tape from the file reel, eliminating the need for the accelerating pulses to be delivered to the file reel at the same frequency. The invention detects the change in counts per unit time that occurs with tape attachment to the machine reel and signals the controller that the tape attachment has occurred.

BRIEF DESCRIPTION OF THE DRAWINGS

The above and other advantages, features, and objectives of the present invention can be better understood from the following more particular description of the preferred embodiment of the invention, presented in conjunction with the accompanying drawings, wherein.

DESCRIPTION OF THE PREFERRED EMBODIMENT

The following is a description of the best presently contemplated mode of carrying out the present invention. The description is given to illustrate the principles, objectives, features, and advantages of the invention and is not to be taken in a limiting sense. For the true scope of the invention, refer to the appended claims.

Figure 1:
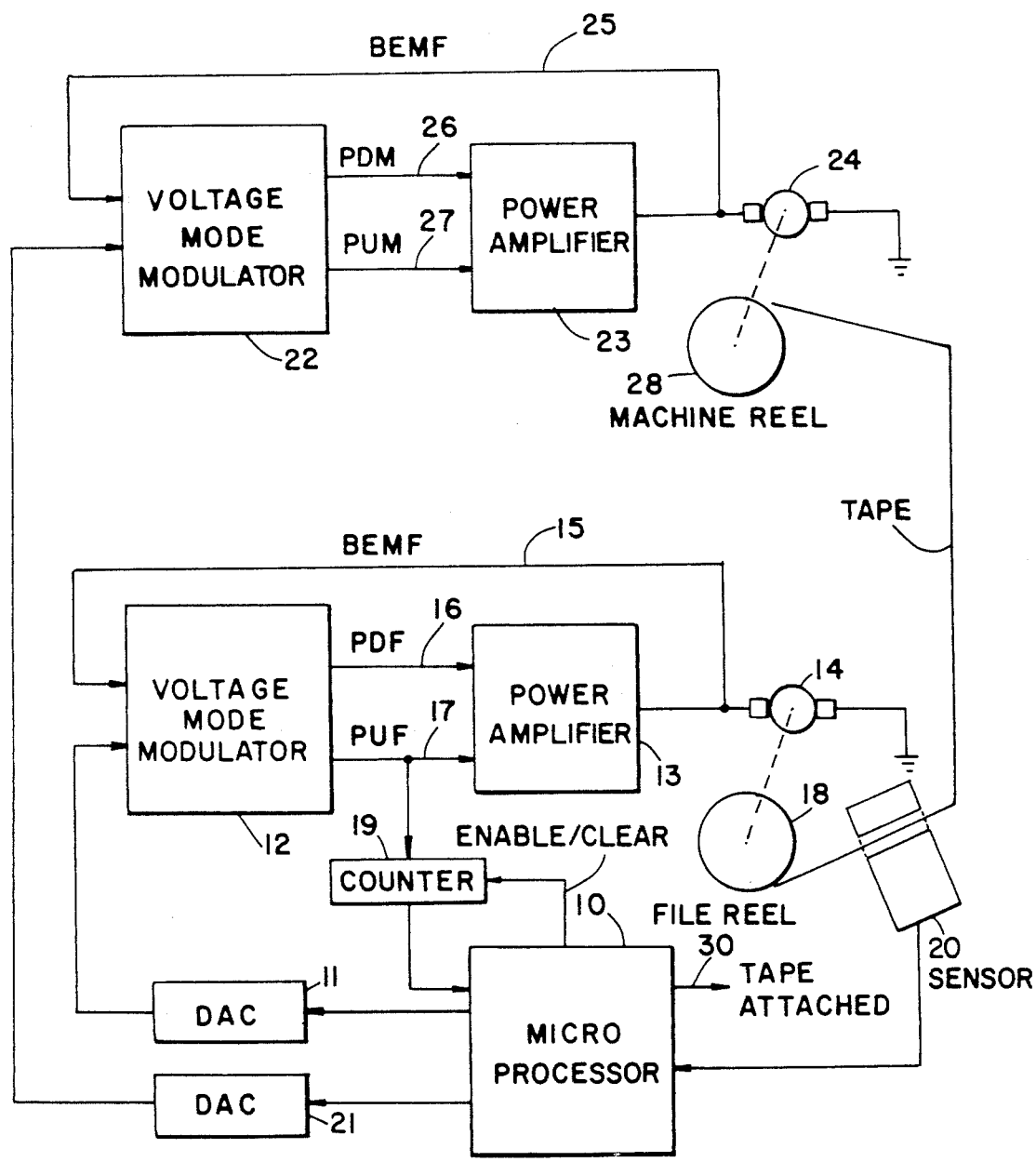
FIG. 1 is a block diagram showing the key elements of the present invention.

FIG. 1 is a block diagram showing the key elements used with the present invention. A microprocessor 10 supplies a digital signal to a digital to analog converter (DAC) 11 which is proportional to the desired velocity of the file reel 18. The DAC 11 converts the digital signal to an analog signal and applies this analog signal to a voltage mode modulator 12. The voltage mode modulator 12 has two outputs, PDF (pump down file) 16 and PU (pump up file) 17. These two outputs 16–17 are normally off (no DPF or PUF signal present), but at predetermined sampling times, one of them may be turned on.

A power amplifier 13 converts the PDF signal 16, when it is momentarily on, to a momentary current pulse (typically a negative current pulse) delivered to the file reel motor 14 causing it to decelerate. Similarly, the power amplifier 13 converts the PUF signal 17, when it is momentarily on, to a momentary current pulse (typically a positive current pulse) delivered to the motor 14 causing it to accelerate. The motor 14 is mechanically coupled to file reel 18. The BEMF (Back EMF) signal 15, a voltage which is proportional to the velocity of the file motor 14, is applied to a second input of the voltage mode modulator 12.

As thus described, the elements 11-17 form a closed loop servo system using velocity feedback. The DAC 11 holds the reference velocity. The voltage mode modulator, at predetermined times, (when the motor current has been allowed to decay near zero) samples the velocity of the motor 14 by means of the BEMF signal 15 and compares it to the reference voltage. Depending upon the comparison, the PDF signal 16 may be momentarily turned on to decelerate the motor 14, the PUF signal 17 may be momentarily turned on to accelerate the motor 14, or nothing may happen.

The machine reel 28 is operated by a closed loop servo system 21-27 in a manner analogous to that of the file reel described above. The only basic difference between the two servo systems is that the DACs 11 and 21 provide different reference velocities to their respective servo systems. Further, the file reel servo includes a counter 19 that counts the occurrences of the PUF signal 17. Operation of this counter 19 (e.g., enabilization and initialization) is controlled by the microprocessor 10. Alternatively, a suitable register within the microprocessor 10 could be used to perform the counter function.

While the tape is being threaded, the PUF signal 17 and the PUM signal 27 will be turned on many times a second to keep the motors 14 and 24 turning at the desired velocity. The PDF signal 16 and the PDM signal 26 will be turned on only if the motors 14 and 24, respectively, exceed the desired velocity. When the tape attaches to the machine reel, the machine reel, through the attached tape, begins to support at least in part the desired rotational threading velocity of the file reel. When this occurs, the PUF signal 17 need be applied less frequently, if at all, to accelerate the file motor 14.

The microprocessor 10 in conjunction with the counter 19 counts the number of times the PUF signal 17 is turned on per unit time. When the count falls below some minimum number, the tape is attached and the microprocessor stops the load operation by issuing a TAPE ATTACHED signal 30.

Another feature of the invention is its ability to determine that the tape is not going to attach to the machine reel during a threading process. If the PUF signal 17 has been counted for too many unit times, as determined by the maximum time it should take for the tape to attach, the microprocessor 10 causes the file reel to rewind so that the automatic threading process can be started again.

Still another feature of the invention is its ability to determine that the tape is probably never going to attach. If the microprocessor 10 determines that the automatic threading process has been restarted a predetermined number of times, appropriate control signals can be generated to cause the file reel to rewind the tape and cease tape threading operations.

Figure 2:
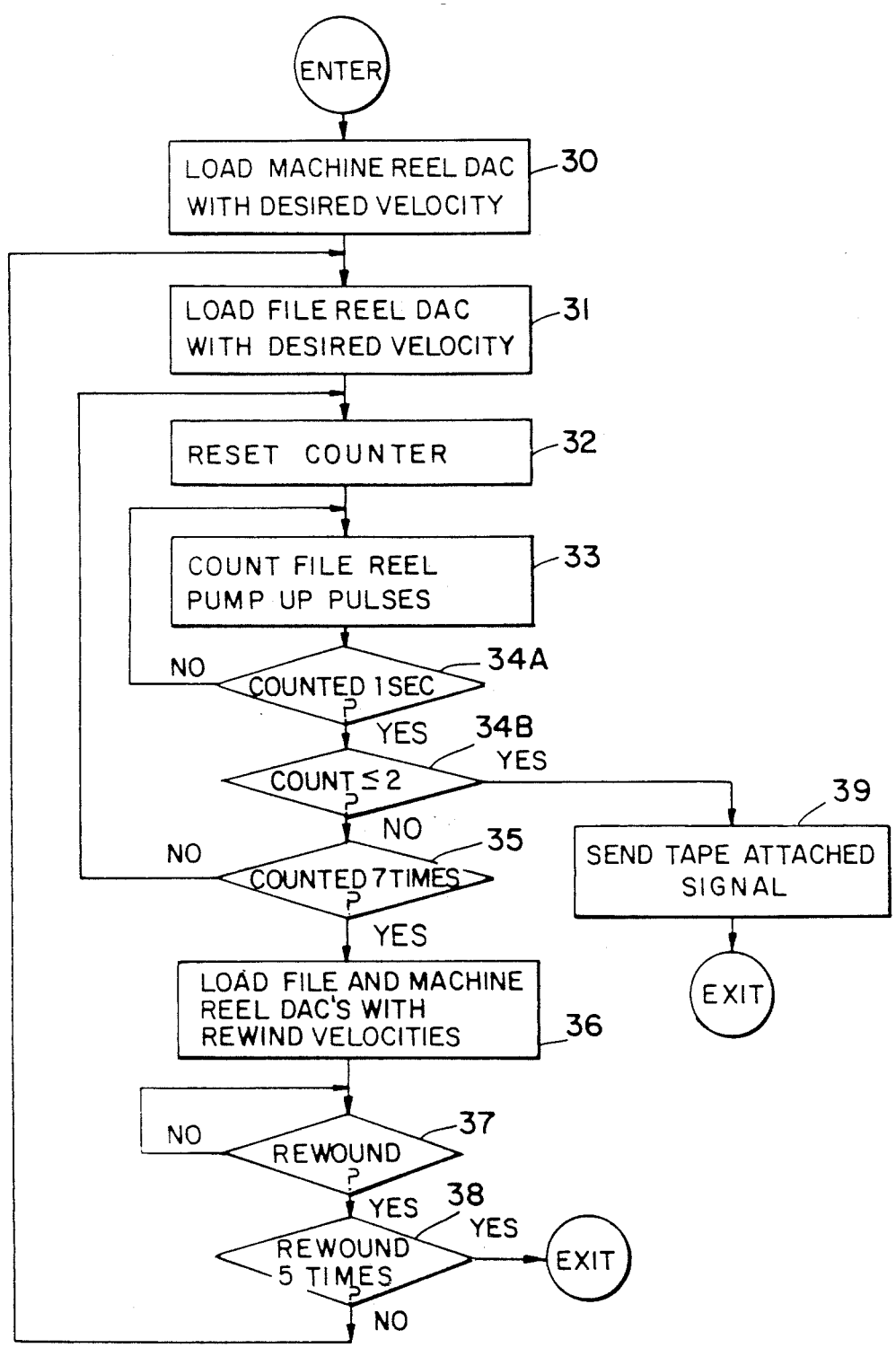
FIG. 2 is a flow diagram showing the method used by the present invention.

Referring next to FIG. 2, there is shown a flow diagram of the method used by the present invention. In blocks 30 and 31, the DAC's 11 and 21 (FIG. 1) are loaded with digital numbers corresponding to the desired velocities of the file and machine motors. The counter 19 (or an equivalent counter) internal to the microprocessor 10 is reset in block 32 PUF pulses 17 (FIG. 1) are counted in block 33 in the counter 19. In blocks 34A, a determination is made as to whether the PUF pulses have been counted for 1 second. If not, the counting indicated in block 33 continues.

At the end of one second, block 34B checks the count held in the counter 19 to see if it is less than 2. If the answer is yes, the invention assumes the tape is attached and block 39 signals this fact. If the answer is no, block 35 checks to see if the count has been performed seven times. If the answer is no, the PUF counting process of blocks 32-34 is repeated. If the answer is yes, the tape is rewound on the file reel in block or step 36.

In Block 37, a check is made to see if the file reel is rewound. This is determined by a photo sensitive sensor 20 (FIG. 1), such as a light emitting diode (LED)-photo diode combination. When the tape is in the path, it blocks the LED from shining on the photo sensitive diode. When it is rewound the correct amount, the light from the LED triggers the photo sensitive diode, signalling tha the file reel is rewound.

Block 38 of FIG. 2 checks to see if the file reel has been rewound five times. If the answer is no, the tape threading process is repeated, starting with block 31. If the answer is yes, no more threading attempts are made.

While specific numbers and times are used in blocks 34A, 34B, 35 and 38 of FIG. 2, it is to be emphasized that these numbers and times are used only to illustrate the principles of the invention. Any numbers could be used, as needed, in order to meet the specific requirements of the magnetic tape system on which the invention is being used. Further, while the invention has been described with reference to monitoring and determining a decrease in the PUF pulse rate, it should be apparent that a similar result would be obtained through monitoring and determining a change in any of the other pulse rates associated with the tape threading operation. Experience indicates that a given rate will change by at least a factor of 2 once a tape attached condition occurs.

In the preferred embodiment of the invention, the microprocessor 10 may be realized with a Z80 type of microprocessor, available commercially from Zilog, Mostek, and other manufacturers. Those skilled in the art, given the flow diagram of FIG. 2 and the above description, could readily program the microprocessor 10 to carry out the invention as described. The sensor 20 of FIG. 1 may be realized with any EOT/BOT optical sensor which is well known in the prior art. The counter 19 is, in the preferred embodiment an 8 bit counter. The other components shown in FIG. 1 may be conventional components of a typical tape system.

As thus described, a simple and reliable method and system for sensing a tape attached condition has been presented. No adjustments are required, and the system is not sensitive to changes in air pressure, mechanical switches, or the like, as are prior art schemes.

What is claimed is:

1. A tape attached sensor for sensing when tape is attached to a machine reel of a tape system, said tape system including a file reel and means for automatically threading tape from the file reel to the machine reel, said tape attached sensor comprising:
   first servo control means for controlling the rotation of said machine reel, said first servo control means including a machine reel motor for rotating the machine reel at substantially a prescribed velocity in response to current pulses delivered to said machine reel motor, said machine reel current pulses having a frequency and polarity associated therewith that maintain the prescribed rotational velocity of the machine reel regardless of whether tape is attached thereto or not;

second servo control means for controlling the rotation of said file reel, said second servo control means including a file reel motor for rotating the file reel at substantially a prescribed velocity in response to current pulses delivered to said file reel motor, said file reel current pulses having a frequency and polarity associated therewith that maintain the prescribed rotational velocity of the file reel regardless of whether tape unwrapped therefrom has attached to the file reel or not; and comparison means, for comparing the frequency of occurrence of said file reel current pulses during an automatic tape threading process and for signalling a tape attached condition as soon as the frequency of occurrence of said file reel current pulses changes by at least a predetermined amount, said comparison means including a counter for counting the number of file reel current pules delivered to said file reel motor during said automatic tape threading process, which file reel current pulses impart a desired rotational velocity to said file reel and unwind a length of tape therefrom that can be automatically threaded to said machine reel, and wherein the rotation of said file reel is supported at least in part by the rotation of said machine reel once the tape has attached thereto, whereby after tape attachment said file reel current pulses need not be delivered to said file reel motor at the same rate as said file reel current pulses were delivered prior to tape attachment, and further whereby the frequency of occurrence of said file reel current pulses decreases after the tape has attached to the machine reel.

2. The tape attached sensor as defined in claim 1 further including means for rewinding said file reel and initiating the automatic threading process again if said tape attached condition is not signaled within a predetermined amount of time, said predetermined amount of time being a maximum tape threading time associated with the operation of said automatic tape threading means.

3. The tape attached sensor as defined in claim 2 further comprising means for stopping the tape threading process if said tape attached condition is not signaled after a predetermined number of file reel rewinds.

4. The tape attached sensor as defined in claim 3 wherein said predetermined maximum tape threading time is at least six seconds and wherein said predetermined number of file reel rewinds is at least four.

5. The tape attached sensor as defined in claim 1 wherein said comparison means further comprises a microprocessor for monitoring the count held in said counter and for generating timing and control signals used during the comparison process.

6. The tape attached sensor as defined in claim 5 wherein said microprocessor is further coupled to and controls the operation of said first and second servo control means.

7. In a system having automatic tape threading means for threading a tape from a first reel to a second reel, said first and second reels having first and second motors respectively coupled thereto, and each of said motors being responsive to acceleration or deceleration control pulses from a motor control circuit in order to controllably accelerate or decelerate the respective motor, a system for sensing when the tape from the first reel has become attached to the second reel during a tape threading operation comprising:

speed control means for controlling the rotational speed of said motors, and hence said first and second reels, during said tape threading operation, said speed control means being adapted to rotate said first and second reels at prescribed velocities regardless of whether the tape from the first reel has attached to the second reel;

monitoring means for monitoring the frequency of occurrence of said acceleration control pulses delivered to a select one of said motors during the tape threading operation, said monitoring means including a counter for counting the number of said acceleration control pulses delivered to said select motor during said tape threading operation, which acceleration control pulses combine to rotate the reel coupled to said select motor at the prescribed rotational velocity, the rotation of the second reel being supported at least in part by the rotation of the first reel once the tape has attached to the second reel, which attachment requires that the acceleration control pulses delivered to said select motor be delivered at a different rate in order to maintain the prescribed rotational velocity; and signaling means for signaling when the frequency of occurrence of said acceleration control pulses changes by a prescribed amount, which change in frequency signals that the tape has attached to the second reel.

8. The system as defined in claim 7 wherein said monitoring means monitors the frequency of occurrence of acceleration pulses delivered to the motor coupled to said first reel, and wherein said signaling means signals a tape attached condition when the frequency of occurrence of said first reel acceleration pulses decreases below a prescribed amount.

* * * * *